United States Patent [19]
Holler

[11] Patent Number: 5,933,643
[45] Date of Patent: Aug. 3, 1999

[54] PROFILER DRIVEN DATA PREFETCHING OPTIMIZATION WHERE CODE GENERATION NOT PERFORMED FOR LOOPS

[75] Inventor: Anne M. Holler, San Jose, Calif.

[73] Assignee: Hewlett Packard Company, Palo Alto, Calif.

[21] Appl. No.: 08/837,422

[22] Filed: Apr. 17, 1997

[51] Int. Cl.[6] ............................................... G06F 9/44
[52] U.S. Cl. ........................ 395/709; 395/704; 395/705; 395/707; 395/702
[58] Field of Search .................... 395/704, 705, 395/709, 383, 707, 702

[56] References Cited

U.S. PATENT DOCUMENTS

| | | | |
|---|---|---|---|
| 5,613,118 | 3/1997 | Heisch et al. | 395/709 |
| 5,655,122 | 8/1997 | Wu | 395/705 |
| 5,689,712 | 11/1997 | Heisch | 395/704 |
| 5,704,053 | 12/1997 | Santhanam | 395/383 |
| 5,729,726 | 3/1998 | Levine et al. | 395/580 |
| 5,768,500 | 6/1998 | Agrawal et al. | 395/704 |
| 5,768,592 | 6/1998 | Chang | 395/704 |
| 5,809,450 | 9/1998 | Chrysos et al. | 702/186 |
| 5,815,720 | 9/1998 | Buzbee | 395/709 |
| 5,832,289 | 11/1998 | Shaw et al. | 395/800.3 |
| 5,838,976 | 11/1998 | Summers | 395/704 |

OTHER PUBLICATIONS

"Advanced Compiler Design Imp[lementation" Steven S. Muchnick pp. 687–703 Sep. 1997.

*Primary Examiner*—Tariq R. Hafiz
*Assistant Examiner*—Todd Ingberg

[57] ABSTRACT

Data processing time is enhanced in a system in which memory prefetch instructions are inserted in the initially completed code as a result of a profiling operation during which the frequency of program hits are recorded using the recorded program hit data, and based upon the magnitude of the hits, the system recompiles the executable code and inserts therein additional prefetched instructions at strategy locations.

26 Claims, 2 Drawing Sheets

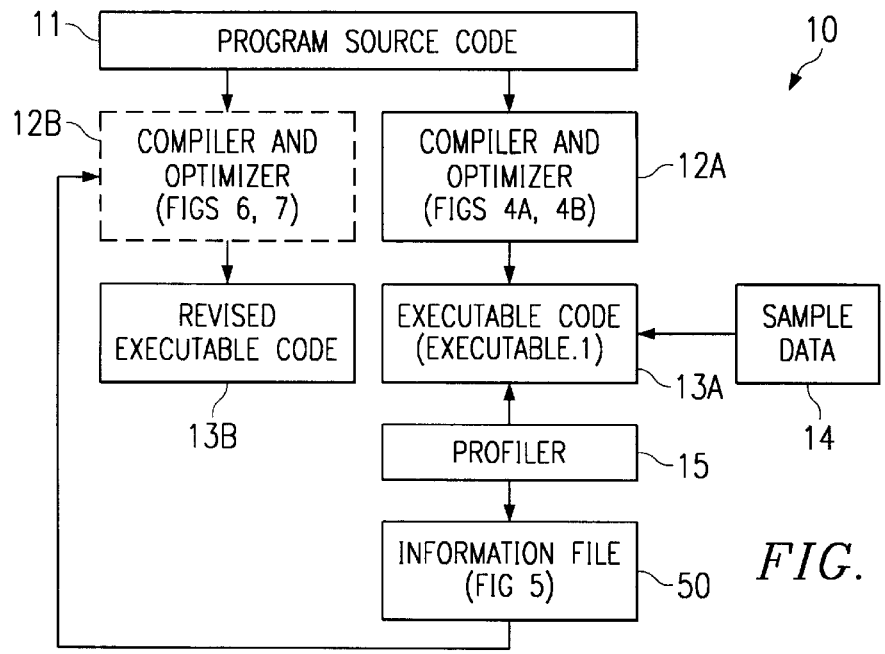
FIG. 1
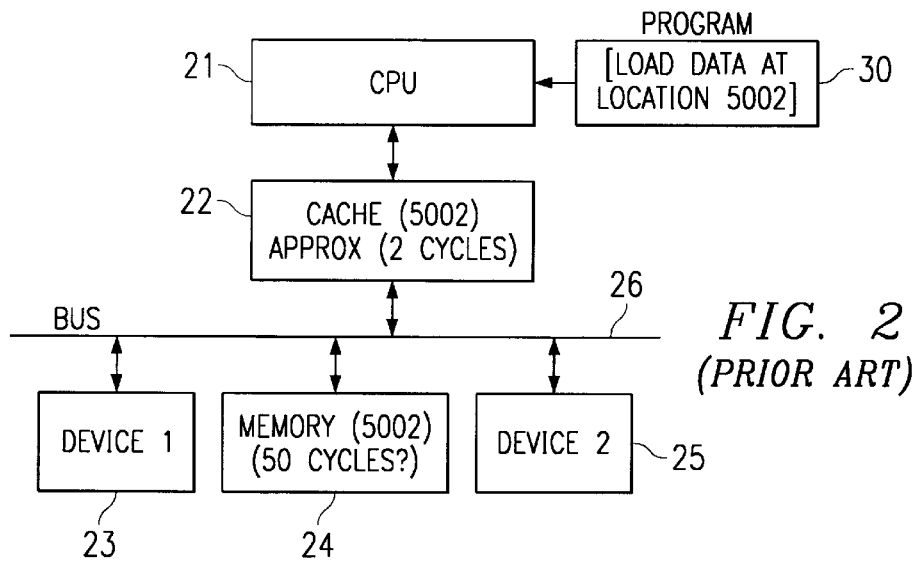
FIG. 2
(PRIOR ART)
30 — PROGRAM C (SOURCE)
31 — CC PROGRAM.C → EXECUTABLE
FIG. 3A
301 — COMPUTE ( )
302 — {
303 — TEMP = a[i]
304 — TEMP ++
   ⋮
305 — RETURN (BAR);
306 — }
FIG. 3B

FIG. 4A

40 — PROGRAM C (SOURCE)
41 — CC PROGRAM.C - OPREFETCHMONITOR → EXCUTABLE.1

FIG. 4B

401 — COMPUTE ( )
402 — {
    LDI    ← (MARKER)
403 — TEMP = a[i]
    LDI    ← (MARKER)
404 — TEMP ++
    LDI    ← (MARKER)
    ⋮
    LDI    ← (MARKER)
405 — RETURN (BAR);
406 — }

FIG. 5

HUMAN READABLE REPRESATATION OF EXECUTABLE

| MACHINE INST | FREQ |
|---|---|
| 50 — LDI | 15 |
| 51 — LOAD a[i] | 157 |
| 52 — ADD | 10 |
| — — — | |
| 53 — RETURN | 22 |

FIG. 6

60 — CC. PROGRAM - OPREFETCHFEEDBACK

FIG. 7

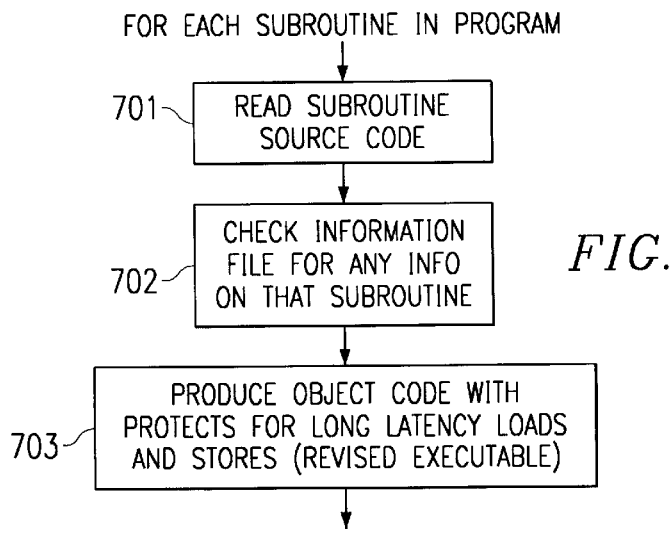

FOR EACH SUBROUTINE IN PROGRAM

701 — READ SUBROUTINE SOURCE CODE

702 — CHECK INFORMATION FILE FOR ANY INFO ON THAT SUBROUTINE

703 — PRODUCE OBJECT CODE WITH PROTECTS FOR LONG LATENCY LOADS AND STORES (REVISED EXECUTABLE)

PROFILER DRIVEN DATA PREFETCHING OPTIMIZATION WHERE CODE GENERATION NOT PERFORMED FOR LOOPS

TECHNICAL FIELD OF THE INVENTION

This invention relates to data prefetching from a memory and more particularly to a system and method for improving prefetching performances in a computer system.

BACKGROUND OF THE INVENTION

The processing unit (CPU) of a typical computer can process data much faster than the memory unit can store or retrieve that data. In order for the CPU to operate as efficiently as possible, an expensive (and fast) memory, called a cache memory, is used to try and keep up with the CPU. When the CPU needs to manipulate data which is not in the cache, it must then retrieve that data from the slower memory, which can cost perhaps 50 machine instruction cycles.

As processors become faster and faster, this problem becomes more severe, particularly because the speed of the processors is increasing faster than the speed of the memory. This problem is particularly solved by sending a data prefetch request to the cache ahead of time before the CPU actually needs the data. This is done by an instruction called a Data Prefetching Instruction. Such instructions are issued well ahead of time on the theory that by the time it is actually needed that data is already in cache and available to the CPU.

Doing such prefetching can be challenging, as prefetch instructions are inserted by the compiler, when the machine control code is compiled from the source instructions. Usually, such prefetch instructions are inserted in situations where there is a loop and the compiler can tell what is going to happen by virtue of a repeated sequence of memory accesses. The compiler determines that a loop is accessing data and looks at new accessing block "2" on a repetitive basis and then accesses data block "1" (data block "2") about 50 bytes away, (assuming that the pattern will continue).

In programs that do not have regular loop patterns, the optimizer is not able to put in the prefetch instructions because it cannot predict what the pattern of access of memory will be. In some situations, a user could insert prefetch instructions, but currently there is no automated way to put in prefetch instructions in situations where predictable loops do not exist.

Therefore, a need exists in the art for a system and method for bringing data in the data cache before that data is actually required where there is not a regular address pattern from which prefetching can be predicted.

SUMMARY OF THE INVENTION

These and other objects, features and technical advantages are achieved in one embodiment of the invention in which the program that is to be compiled is run through a compiler/optimizer to generate a first executable set of code. This code set is then run with a sample data set and the output profiled. The profile routine watches the program run and, from time to time, samples the program's execution to see how long various instructions are taking. The result is the generation of sampling information which contains data pertaining to which memory references tend to take a long time to execute. From this data, an educated guess can be made as to which memory loads probably missed the data cache.

Armed with the sample results information, the system then goes back and recompiles the source program, this time inserting prefetches for those sections of code which took long execution times the first time around. These prefetches could not have been inserted based on any pattern derived from the unaided program.

Accordingly, it is one technical advantage of this invention that a profiler is used to optimize code so that a computer program would run faster than it would otherwise.

It is another technical advantage of this invention that prefetch instructions can be inserted at certain points to optimize the resulting run-time code, the exact points being determined by waiting times within the code as determined by a profiler.

It is a still further technical advantage of this invention that even when prefetching occurs according to a loop pattern, there may be cases where the data that is being prefetched is already in the data cache and these prefetches are removed in order to preserve operating efficiency.

There is a further advantage of this invention that prefetches can be added on a selective basis based upon the feedback from a sample profiler.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates the overall system and method of the invention;

FIG. 2 illustrates a typical CPU system structure in which the invention could operate;

FIGS. 3A and 3B illustrate the typical compiler invocation and the resulting code format;

FIGS. 4A and 4B illustrate the modified computer program instruction and the resulting code format;

FIG. 5 illustrates a chart of the frequency of hits of each program function;

FIG. 6 illustrates the program step which controls the last phase of the system; and FIG. 7 illustrates the flow diagram of the modification of code based upon insertion of prefetches according to a hit table of program functions.

DESCRIPTION OF THE PREFERRED EMBODIMENTS

Before beginning a discussion of the invention, it would perhaps be helpful to review the structure of a typical computing system. Such a typical system is shown in FIG. 2, having CPU 21, cache memory 22, bus 26 connecting main memory 24, to the cache and perhaps several devices 23, 25, connected to the bus. CPU 21, under control of a program, such as program 30, would typically attempt the retrieve information (data) from the main memory 24. Such an information fetch would typically require 50 CPU cycles to achieve. However, if the desired information is located in cache 22, then the time requirement could be reduced to about 2 CPU cycles, depending upon the relative speeds of the CPU and the memory 24.

If prefetch instructions are introduced into Program 30, then the prefetch instruction would direct the system to bring the target data item into cache memory 22 prior to the actual program reference, thereby speeding up the program considerably. Certain prefetches can be anticipated because of the loop nature of certain segments of the program. These loops allow for an assumption to be made that the memory would have to be accessed at a given location at a given future time. Therefore, prefetches can be put in the code so that the anticipated target data would already have been prefetched into the cache and waiting for the CPU at the proper point in the program. However, there are situations where the system would benefit from a prefetch instruction but it has been impossible to insert such an instruction for lack of knowledge about what memory locations are most likely to be used at a particular time. This occurs either because there was not a program loop or perhaps there was a program loop, but the item was already in the cache and prefetch was redundant.

There is shown in FIG. 1 system 10 for optimizing code, such as program source code 11, which code is passed through compiler and optimizer 12A to produce executable code 13A. Compiler and optimizer 12A in the normal mode would operate on code using CC PROGRAM.C (shown in FIG. 3A) to produce executable code 31, which would look similar to the code steps 301–306 shown in FIG. 3B. Instead, using the system and method of the invention, compiler and optimizer 12A uses the program known as CC PROGRAM.C—OPREFETCHMONITOR, as shown in FIG. 4A. This generates a different executable code known as EXECUTABLE.1, 13A. The result of step 41 is that "markers" are added to the normal executable code. In an example shown in FIG. 4B, these markers are called LDI and are shown as lines 402A, 403A, 404A–404N, each LDI occurring ahead of a program statement.

Once executable code 13A is produced by the compiler and optimizer 12A, it is run on sample data 14 and as the executable code is being run, a special tool called a sampling oriented profiler 15, is watching the executable code run. Many such tools exist. For example, at Hewlett-Packard Company, such a profiler is called PROSPECT. Another example of such a profiler is a SPROF, which is generally available. Returning now to FIG. 1, profiler 15 watches the executable code and creates information file 50, which records the relative timings of various instructions.

FIG. 5 shows a chart of the various program operations as they are executing and recording their frequency of hits. For example, the LDI instruction frequency of hitting is 15, whereas the load a[i] frequency hitting is 157. This implies that this load operation is taking much longer to perform than the ADD instruction, which received only 10 hits. The return operation was hit 22 times. This information file 50 contains a snap shot of what the program looks like as it is running and shows which operations take the most time to run. This data snapshot is then read by the compiler and optimizer 12B to produce revised executable code 13B. It should be understood that compiler and optimizer 12B is the same compiler and optimizer 12A run under a different set of options, as shown in FIGS. 6 and 7.

FIG. 6 shows such an instruction 60 and FIG. 7 shows optimizer 12B running under this different option. As shown in FIG. 7, step 701 reads in the source code and uses each subroutine that it encounters in the source code as a key to access information file 50 via step 702 for relative frequency of hits. Based on this information, step 703 inserts prefetches into the executable code on the assumption that a large hit frequency indicates a cache miss.

The program can be modified so that the instructions are given to compiler and optimizer 12B to put in prefetches depending upon either an absolute magnitude of frequency hits or a relative difference between an average or a relative difference between certain hit numbers depending upon the needs of a user. This would be put into instruction 60 (FIG. 6) when compiler and optimizer 12B is set to run on a particular program source code. Based upon the running of compiler and optimizer 12D under the options of FIGS. 6 and 7, revised executable code 13B is generated, which should now execute faster on a particular CPU than code compiled without the benefit of the frequency of hit data from information file 50. A user could run the compiler and optimizer 12B under several different prefetch settings to determine which settings generate a faster executable code set. This would be done by, again, using profiler 15 on the revised executable code and then reiterating until a optimum executable code set is generated based upon several different hit settings. Also, a user could include in the additional code runs different sample data 14 which could be set for different types of inputs, thereby generating a different information file that would generate different optimal code for different situations.

Although the present invention and its advantages have been described in detail, it should be understood that various changes, substitutions and alterations can be made herein without departing from the spirit and scope of the invention as defined by the appended claims.

What is claimed is:

1. A method for controlling the insertion of memory prefetch instructions into code compiled from a source program, the method comprising the steps of:

generating executable code from the source program;

operating the generated executable code with a set of sample data;

observing the operation of the generated executable code during its operation with the sample data to generate information about the operation of the executable code with respect to various instructions within the executable code; and regenerating from the source program a revised executable code, the revised executable code having inserted within it prefetch instructions between certain instructions in accordance with the generated information pertaining to said certain instructions;

wherein the generated executable code is a portion of the source program, and the generated executable code is not a portion of a loop of the source program.

2. The method set forth in claim 1 wherein the information generated is the frequency of hits of the CPU with respect to the various instructions.

3. The method set forth in claim 2 wherein the prefetch instructions are inserted according to the relative frequency of hits and wherein the relative relationship is selectable.

4. The method set forth in claim 1 further including the steps of:

repeating the operating, profiling and regeneration steps, using different sample data; and selecting which revised executable code is best suited for a given type of data.

5. The method set forth in claim 1 wherein the profiling steps includes using a profiler selected from the following list of profilers:
PROSPECT, and
SPROF.

6. In a system having a memory for storing and retrieving data under control of a CPU, the system having a cache memory interposed between the CPU and the memory for the purpose of storing in the cache data that was recently used by the CPU for the purpose of increasing the speed of processing with respect to memory accesses, the system operable to further increase the speed of processing by inserting memory prefetch instructions in executable code so that the system anticipates certain upcoming memory accesses and fetches data from the memory before the time that data is actually needed by the CPU and stores the prefetched data in the cache in anticipation of that data being required by the CPU, the improvement comprising:

means for examining the run time of the executable code as compiled from the source code program to determine portions of the executable code that would benefit from the insertion thereat of memory prefetch instructions; and means for compiling a modified version of the executable code from the source code program, said modified code version containing prefetch instructions inserted therein ahead of operations that have been determined to benefit from such prefetch instructions;

wherein the executable code is a portion of the source program, and the generated executable code is not a portion of a loop of the source program.

7. The invention set forth in claim 6 wherein said examining means includes means for generating an information file of data pertaining to the respective frequency of hits of the various operations of the program.

8. The invention set forth in claim 7 wherein said modified executable code compiling means includes:

means for utilizing the data contained in said information file.

9. The invention set forth in claim 8 wherein said utilization means includes:

means for selecting the magnitude of the hit frequency that is utilized.

10. The invention set forth in claim 6 wherein said examining means includes:

means for running the executable code based on a set of data; and means for profiling the run-time of the executable code.

11. The invention set forth in claim 10 wherein the profiling means includes means for generating an information file of data pertaining to the respective frequency of hits of the various operations of the run-time of the executable code.

12. The invention set forth in claim 11 wherein said modified executable code compiling means includes:

means for utilizing the data contained in said information file.

13. The invention set forth in claim 12 wherein said utilization means includes:

means for selecting the magnitude of the hit frequency that is utilized.

14. A system for controlling the insertion of memory prefetch instructions into code compiled from a source program, the system comprising:

means for generating executable code from the source program;

means for running the generated executable code with a set of sample data;

means for observing the operation of the generated executable code while it is running with the sample data to generate information about the operation of the executable code with respect to various instructions within the executable code; and means for compiling from the source program a revised executable code, the revised executable code having inserted within it prefetch instructions between certain instructions in accordance with the generated information pertaining to said certain instructions;

wherein the certain instructions are not portions of loop structures of the source program.

15. The system set forth in claim 14 wherein the information generated is the frequency of hits of the CPU with respect to the various program instructions.

16. The system set forth in claim 15 wherein the revised executable code compiling means includes:

means for inserting the prefetch instructions in the revised executable code according to the magnitude of the frequency of hits.

17. The system set forth in claim 16 wherein the inserting means further includes:

means for selecting the magnitude of the hit frequency that will trigger an insertion of a prefetch instruction.

18. The system set forth in claim 14 wherein the observing means includes a profiler selected from the following list of profilers:
PROSPECT, and
SPROF.

19. A method for improving processing time for use in a system having a memory for storing and retrieving data under control of a CPU, the system having a cache memory interposed between the CPU and the memory for the purpose of storing in the cache data that was recently used by the CPU for the purpose of increasing the speed of processing with respect to memory accesses, the system operable to further increase the speed of processing by inserting memory prefetch instructions in executable code so that the system anticipates certain upcoming memory accesses and fetches data from the memory before the time that data is actually needed by the CPU and stores the prefetched data in the cache in anticipation of that data being required by the CPU, the method comprising the steps of:

examining the run-time of the executable code as compiled from the source code program to determine portions of the executable code that would benefit from the insertion thereat of memory prefetch instructions; and compiling a modified version of the executable code from the source code program, said modified code version containing prefetch instructions inserted therein ahead of operations that have been determined to benefit from such prefetch instructions;

wherein the executable code is a portion of the source program, and the executable code is not a portion of a loop of the source program.

20. The method set forth in claim 19 wherein said examining step includes the step of generating an information file of data pertaining to the respective frequency of hits of the various operations of the program.

21. The method set forth in claim 20 wherein said modified executable code compiling step includes the step of:

utilizing the data contained in said information file.

22. The method set forth in claim 21 wherein said utilization step includes the step of:

selecting the magnitude of the hit frequency that is utilized.

23. The method set forth in claim 19 wherein said examining step includes the steps of:

running the executable code based on a set of data; and profiling the run-time of the executable code.

24. The method set forth in claim 19 wherein the profiling step includes the step of:

generating an information file of data pertaining to the respective frequency of hits of the various operations of the run-time of the executable code.

25. The method set forth in claim 24 wherein said modified executable code compiling step includes the step of:

utilizing the data contained in said information file.

26. The method set forth in claim 24 wherein said utilization step includes the step of:

selecting the magnitude of the hit frequency that is utilized.

\* \* \* \* \*